(12) United States Patent
Song et al.

(10) Patent No.: US 9,636,822 B2
(45) Date of Patent: May 2, 2017

(54) METHOD AND DEVICE FOR GENERATING ROBOT CONTROL SCENARIO

(71) Applicant: FUTURE ROBOT CO., LTD., Seongnam-si, Gyeonggi-do (KR)

(72) Inventors: Se Kyong Song, Seongnam-si (KR); Won Yong Lee, Suwon-si (KR)

(73) Assignee: FUTURE ROBOT CO., LTD., Seongnam-si, Gyeonggi-Do (KR)

( * ) Notice: Subject to any disclaimer, the term of this patent is extended or adjusted under 35 U.S.C. 154(b) by 28 days.

(21) Appl. No.: 14/415,965

(22) PCT Filed: Jul. 16, 2013

(86) PCT No.: PCT/KR2013/006362
§ 371 (c)(1),
(2) Date: Jan. 20, 2015

(87) PCT Pub. No.: WO2014/017773
PCT Pub. Date: Jan. 30, 2014

(65) Prior Publication Data
US 2015/0183112 A1    Jul. 2, 2015

(30) Foreign Application Priority Data

Jul. 23, 2012   (KR) .......................... 10-2012-0080067

(51) Int. Cl.
*B25J 9/16*    (2006.01)
*B25J 9/00*    (2006.01)
(Continued)

(52) U.S. Cl.
CPC ............... *B25J 9/16* (2013.01); *B25J 9/0003* (2013.01); *B25J 9/1656* (2013.01);
(Continued)

(58) Field of Classification Search
CPC ....... G06N 3/008; B25J 19/023; B25J 9/0003; B25J 11/008; B25J 9/1671; B25J 9/16;
(Continued)

(56) References Cited

U.S. PATENT DOCUMENTS

2004/0041822 A1* 3/2004 Iizuka ................... G06T 15/005
345/634
2004/0153211 A1* 8/2004 Kamoto ................. A63H 11/00
700/245

(Continued)

FOREIGN PATENT DOCUMENTS

JP          4560078 B2    10/2010
KR    10-2005-0031525 A   4/2005
(Continued)

OTHER PUBLICATIONS

Search Report for International Application No. PCT/KR2013/006362.

*Primary Examiner* — Jason Holloway
(74) *Attorney, Agent, or Firm* — LRK Patent Law Firm (57) ABSTRACT

A method for generating a robot control scenario includes generating a judgement frame by a computational means, storing the judgement frame in a storage means, and displaying the judgement frame by receiving a situation cognition frame and an expression frame; generating a stage by the computation means, storing the stage in the storage means, and displaying the stage by selecting at least one judgement frame and at least one transition frame; and connecting a transition frame of one stage to another stage in at least two stages by the computation means, storing the connected stages in the storage means, and displaying the connected stages. According to the present invention, a robot exists within a close distance to people in a human living space, and can recognize a surrounding situation and infor- (Continued)

mation provided by the people and provide a service that meets various requests desired by the people.

6 Claims, 6 Drawing Sheets

(51) Int. Cl.
    *G06N 3/00*         (2006.01)
    *B25J 11/00*       (2006.01)
    *B25J 19/02*       (2006.01)

(52) U.S. Cl.
    CPC .......... *B25J 11/0005* (2013.01); *G06N 3/008* (2013.01); *B25J 9/1671* (2013.01); *B25J 19/023* (2013.01); *G05B 2219/40393* (2013.01)

(58) Field of Classification Search
    CPC ................ B25J 9/1656; B25J 11/0005; G05B 2219/40393
    See application file for complete search history.

(56) References Cited

U.S. PATENT DOCUMENTS

| | | | | |
|---|---|---|---|---|
| 2005/0216126 | A1* | 9/2005 | Koselka | ................... B25J 5/007 700/259 |
| 2006/0293787 | A1* | 12/2006 | Kanda | ................... G06N 3/008 700/245 |
| 2013/0226344 | A1* | 8/2013 | Wong | ................... G05D 1/024 700/258 |

FOREIGN PATENT DOCUMENTS

| | | |
|---|---|---|
| KR | 10-2008-0037287 A | 4/2008 |
| KR | 10-0824317 B1 | 4/2008 |
| KR | 10-2009-0078244 A | 7/2009 |
| KR | 10-2011-0026212 A | 3/2011 |
| KR | 10-1106002 B1 | 1/2012 |

* cited by examiner

FIG.1

RELATED ART

METHOD AND DEVICE FOR GENERATING ROBOT CONTROL SCENARIO

TECHNICAL FIELD

The present invention relates to a method and device for easily and intuitively creating a scenario for controlling motions and expressions of a robot by a general user, not a robot engineer, by using a situation cognition method and an expression method similar to a human being.

BACKGROUND ART

Presently, various kinds of robots are used in a variety of fields such as real life, factory automation and the like, and the robots respectively have a unique control scenario according to a particular purpose of each field and operate according to the control scenario.

A robot in the field of factory automation has an operation control scenario for performing a repetitive motion so as to be appropriate to a repetitive work. However, a scenario for simply repeating an operation is inappropriate in the field of service robot such as an advertisement robot, an education robot, an entertainment robot or the like used in daily life or various locations, and a control scenario for diversely operating and responding a robot according to a corresponding location or service is required. In addition, when the location or the service using the robot is changed, the control scenario for operating the robot needs to be modified although the same robot is used.

Accordingly, a method of creating and modifying a robot control scenario is needed so that a general robot user, not a robot engineer, may recognize diverse and complicated situations without expertise by combining cognition information recognized through sensors (a ultrasonic sensor, a laser sensor, a camera, a microphone, a touch sensor, a motion sensor and the like) that a robot has according to a location and a service using the robot at a service site, and provide an expression appropriate to a cognition situation by combining operation and expression functions (a facial expression, a voice, a sound effect, an LED, an ignition, a gesture, a display and the like) that the robot has.

An authoring tool for creating contents, with which a general user may create a method of controlling operation of a robot at a level other than a code level, a robot contents authoring system which allows a plurality of users to individually create robot contents in a web environment and the like exist in the prior art.

Similarly mimicking a situation recognition method and an expression method of a human being so that a robot may recognize a situation in a way further similar to a human being and make a natural and vivid expression corresponding to the situation is very important to enhance the value of service robot products and satisfaction of users. In addition, if a control scenario can be modified based on the situation recognition method and the expression method of a human being in order to create and modify the control scenario according to the location and service of the robot by a general user using the robot at a service site, not a robot engineer ignorant of a situation of the service site and user's needs, the general user may create and modify the robot control scenario more easily and intuitively.

A human being recognizes a specific situation by using composite information obtained through sensing organs such as a sense of sight through eyes, a sense of touch through skin or the like, a sense of hearing through sounds and the like. For example, a human being recognizes a situation using composite recognition information of a plurality of sensing organs, such as "A child walks to me in front of me, and the child does not see straight ahead, but looks elsewhere", and behaves or expresses according to the situation.

As an expression method, a human being makes a composite expression through a plurality of means, rather than a single motion or expression of a single means. For example, possibility of collision is determined according the situation recognized as described above, and in response thereto, a composite expression such as "Say watch out, and stops or moves to avoid the moving route of the child" is made through a plurality of means.

Accordingly, even in the case of a robot mimicking a human being, in order to make the robot to be similar to the situation recognition and expression method of the human being, a general user knowing a situation of a site and needs of a robot service, not a robot engineer, should be able to create and modify a robot control scenario based on the situation recognition and expression method of the human being.

However, since conventional techniques modify contents of a robot in a formalized and repetitive method of selecting a condition corresponding to input of a specific single sensor, such as simply touching the head or an arm of the robot by a user, there is a problem in that robot contents appropriate to a very complicated and diverse situation recognition method of a human being cannot be provided, and, furthermore, there is a problem in that rather than creating and reusing contents of a robot based on the expression method of a human being using a composite expression means, a user should select a motion of each single expression means and create an expression one by one whenever a scenario is created.

Other than these, the convention techniques have a problem in that in order to create a control scenario of a robot, motions or contents of the robot should be arranged on timelines corresponding to an amount of time for operating the robot.

Figure 1:
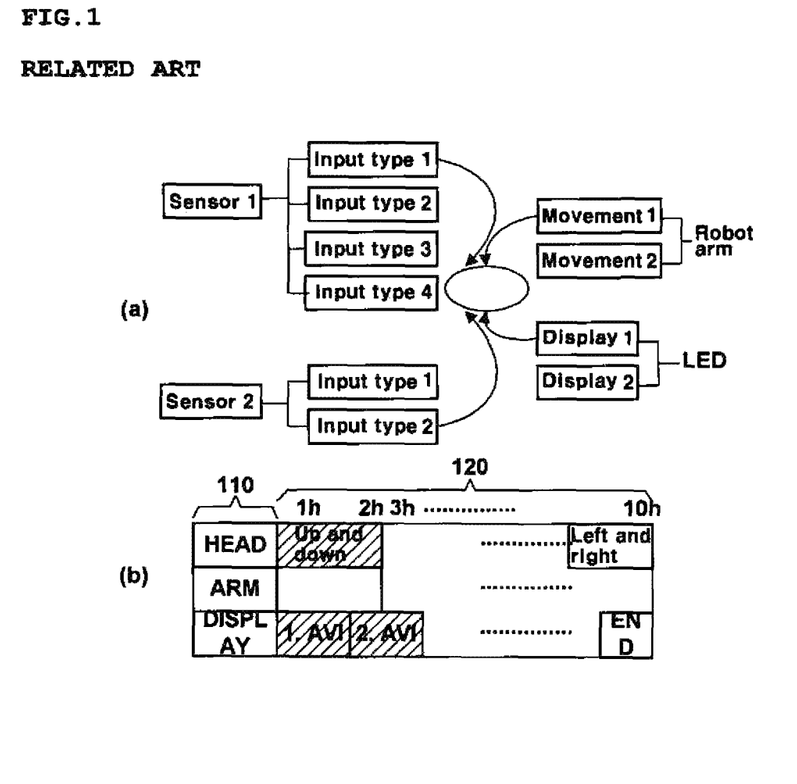
FIG. 1 is a view showing a conventional method of creating a robot control scenario.

That is, as shown in FIG. 1(a), the conventional techniques have a problem in that a user should select input conditions of sensors of a robot one by one and connect an expression method of a single expression means according thereto whenever a robot control scenario is created and repeat the works described above according to a location and a service method of the robot.

In addition, a robot control scenario method using input of single sensors as direct cognition means as shown in FIG. 1(a) is a recognition method and an expression method of a low level unlike the composite situation recognition method and expression method of a human being, and there is a problem in that it is inconvenient for a general user, not a robot engineer, to create and modify a robot control scenario, and even the robot engineer should design complex logic every time.

In addition, in the conventional techniques, a robot control scenario is configured of successive robot controls connected to a specific condition and behaviors corresponding thereto as shown in FIG. 1(b). Accordingly, when a scenario for controlling a robot for ten hours is created, a user should arrange a robot control element for each expression means 110 of the robot one by one on the timelines 120 corresponding to an amount of ten hours to create a control scenario of the robot, and thus there is a problem in that it is very difficult to create a scenario, and the robot may not operate appropriately to a variety of situations in a way similar to a human being.

DISCLOSURE OF INVENTION

Technical Problem

Therefore, the present invention has been made in view of the above problems, and it is an object of the present invention to provide a method and device for creating a robot control scenario by using a situation cognition method and an expression method similar to a human being.

Another object of the present invention is to provide a method and device for creating a robot control scenario, in which a robot may operate in a way similar to a human being by actively and diversely operating according to a variety of situations through connection of diverse stages appropriate to a situation.

Still another object of the present invention is to provide a method and device for creating an indefinitely working robot control scenario without an effort of arranging motions or contents of a robot one by one on all the timelines corresponding to an amount of time for operating the robot to be appropriate to a situation.

Still another object of the present invention is to provide a method and device for creating a robot control scenario by a user in the same way regardless of a type of a robot.

Technical Solution

To accomplish the above objects, according to one aspect of the present invention, there is provided a method of creating a robot control scenario, the method including the steps of receiving a situation cognition frame and an expression frame and, by a computational means, creating a judgment frame, storing the judgment frame in a storage means, and displaying the judgment frame; selecting at least one or more of the judgment frames and at least one or more transition frames and, by the computation means, creating a stage, storing the stage in the storage means, and displaying the stage; and connecting a transition frame of one stage to another stage, storing connection of the stages in the storage means, and displaying the connection of the stages by the computation means, in at least two or more stages.

According to another aspect of the present invention, there is provided a device for creating a robot control scenario, the device including: a storage unit for storing data through an electric or magnetic signal; a judgment frame creation unit for selecting a situation cognition frame and an expression frame, creating a judgment frame, and storing the judgment frame in the storage unit; a stage creation unit for selecting at least one or more of the judgment frames and at least one or more transition frames, creating a stage, and storing the stage in the storage unit; and a scenario creation unit for connecting a transition frame of one stage to another stage and storing connection of the stages in the storage unit, in at least two or more stages.

Advantageous Effects

According to the present invention, it is effective in that a user may easily and intuitively create a robot control scenario without knowledge about a robot by using a situation cognition method and an expression method similar to a human being.

In addition, according to the present invention, it is effective in that a robot control scenario for operating a robot in a way similar to a human being can be created by using a situation cognition method and an expression method similar to the human being.

In addition, according to the present invention, it is effective in that a robot control scenario can be created, in which a robot may operate in a way similar to a human being by actively and diversely operating according to a variety of situations through connection of diverse stages appropriate to a situation.

In addition, according to the present invention, it is effective in that a user may create an indefinitely working robot control scenario without an effort of arranging motions or contents of a robot one by one on all the timelines corresponding to an amount of time for operating the robot through connection of diverse stages appropriate to a situation.

In addition, according to the present invention, it is effective in that a situation cognition frame and an expression frame created by using a situation cognition method and an expression method similar to a human being may be reused for creation and modification of a robot control scenario according to a location or a service using a robot.

In addition, according to the present invention, it is effective in that a user may create a robot control scenario in the same way regardless of a type of a robot.

According to the present invention, it is effective in that a combination of complex correlations among various kinds of cognition situation information (the number of persons, height of a person, motions, a staying time, recognition of a voice, recognition of a face or a gesture and the like) may be defined to be appropriate to a situation of a site, a combination of robot expressions naturally and vividly felt by people may be defined, and a situation cognition method and an expression method similar to a human being can be provided by defining correlations between the defined situation cognition frames and expression frames.

According to the present invention, it is effective in that a user may easily and intuitively create a robot control scenario without knowledge about a robot so that the robot may provide a service to a variety of customers (children, adults, seniors, one person, a plurality of persons, a temporary user, a person using with interest and the like) at a service location.

DESCRIPTION OF SYMBOLS

110: Expression means 120, 720: Timeline
510, 710: Constitutional element

BEST MODE FOR CARRYING OUT THE INVENTION

Details of the objects and technical configuration of the present invention described above and operational effects according thereto will be clearly understood hereinafter by the detailed description with reference to the accompanying drawings attached in the specification of the present invention. The embodiment of the present invention will be described in detail with reference to the accompanying drawings.

Since those skilled in the art may implement diverse applications of the present invention through the embodiments of this specification, arbitrary embodiments described in the detailed descriptions of the present invention are for exemplary purposes to describe the present invention more apparently and are not intended to limit the scope of the present disclosure to the embodiments.

The functional units expressed in this specification are merely examples for implementing the present invention. Accordingly, other functional units may be used in other implementations of the present invention without departing from the spirit and scope of the present invention. In addition, although each functional unit can be implemented only in a pure hardware or software configuration, it also can be implemented by combining various hardware or software configurations performing the same function.

In this specification, although a computational means may be a general-purpose central processing unit (CPU), it also can be a programmable device (CPLD or FPGA) or an application specific integrated circuit (ASIC) implemented to be appropriate to a specific purpose. In addition, a storage means or a storage unit may be a volatile memory element, a non-volatile memory element or a non-volatile electromagnetic storage device.

A method of creating a robot control scenario according to the present invention may be directly performed in a robot or may be performed in a separate device external to the robot.

Figure 4:
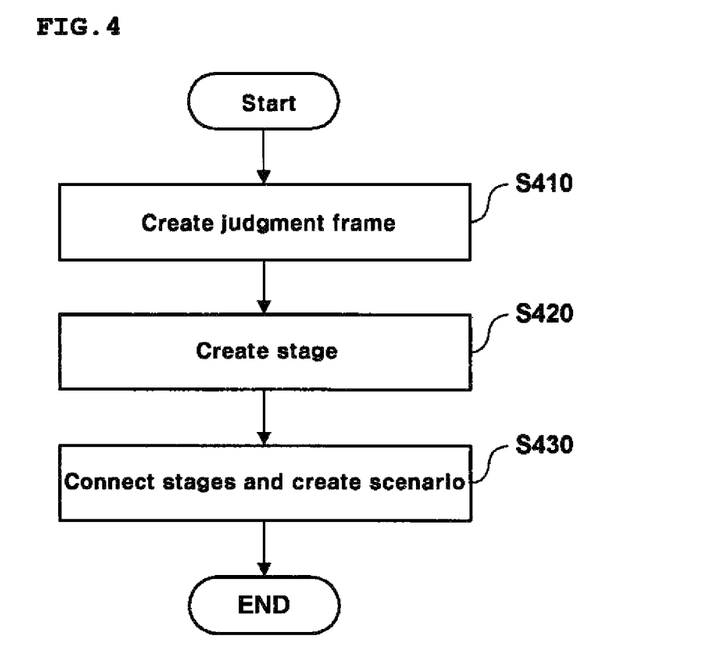
FIG. 4 is a flowchart illustrating a method of creating a robot control scenario according to the present invention.

An embodiment of a method of creating a robot control scenario according to the present invention will be described with reference to FIG. 4. The method of creating a robot control scenario according to the present invention includes a judgment frame creation step (S410), a stage creation step (S420) and a scenario creation stage (S430).

The judgment frame creation step (S410) starts by receiving a situation cognition frame and an expression frame from a user.

Figure 5:
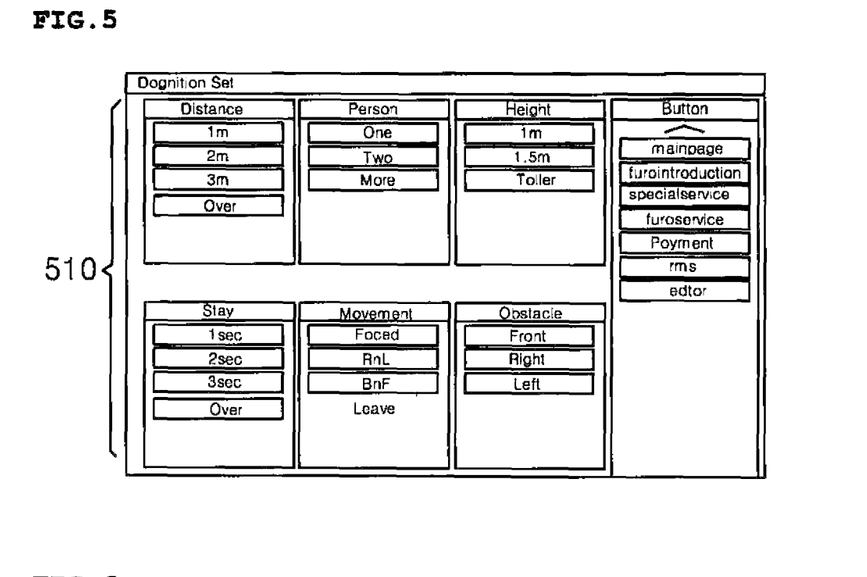
FIG. 5 is an exemplary view showing selecton of a situation cognition frame.

The user may input a situation cognition frame by selecting a situation cognition frame as shown in FIG. 5, not by simply selecting a sensing input of a direct recognition means.

Selecting a situation cognition frame may mean selecting constitutional elements 510 describing a corresponding situation.

Referring to FIG. 5, an example of inputting a situation cognition frame by selecting a configuration describing a situation of "One person about 1.5 meters tall approaches one meter in front of a robot and stays for one or more seconds" may be presented.

The situation cognition frame is for determining an external situation of the robot by using input of at least one or more recognition means.

As far as the recognition means is a means for recognizing an external situation of a robot, such as a camera, a touch sensor, a laser sensor, a microphone, a touch display device or the like, a type thereof is not limited. In addition, the external situation of a robot includes flow of time. Accordingly, a timer for recognizing flow of specific time is also included in the recognition means.

For example, when the recognition means are a camera and a laser sensor, the computational means grasps the number of objects around a robot, movement of an object, moving direction of the object, an object size and the like through the input of the laser sensor and takes images of the object through the camera, and the computational means recognizes whether or not the object is a human being, and if the object is a human being, the sex, age and the like of the human being can be grasped by recognizing the face of the human being.

Figure 2:
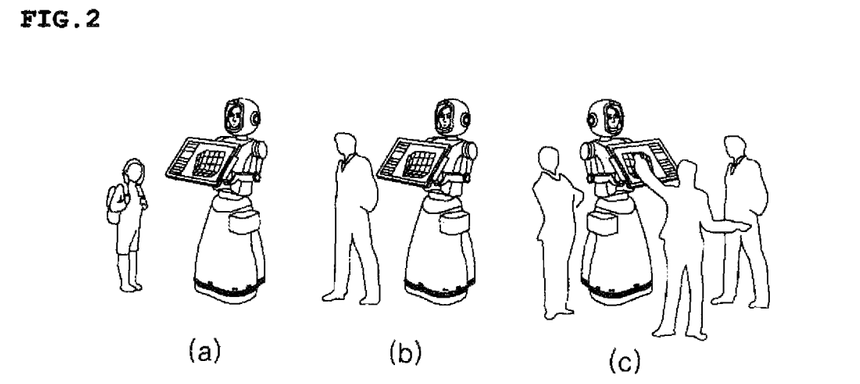
FIG. 2 is an exemplary view showing situation cognition of a robot.

In this case, a situation cognition frame of 'One child 1.5 meters tall or smaller approaches a robot' as shown in FIG. 2(a), a situation cognition frame of 'One male adult 1.5 meters or taller passes through a robot' as shown in FIG. 2(b), and a situation cognition frame of 'A plurality of human beings stays around a robot' as shown in FIG. 2(c) can be created by using inputs of the camera and the laser sensor.

Figure 3:
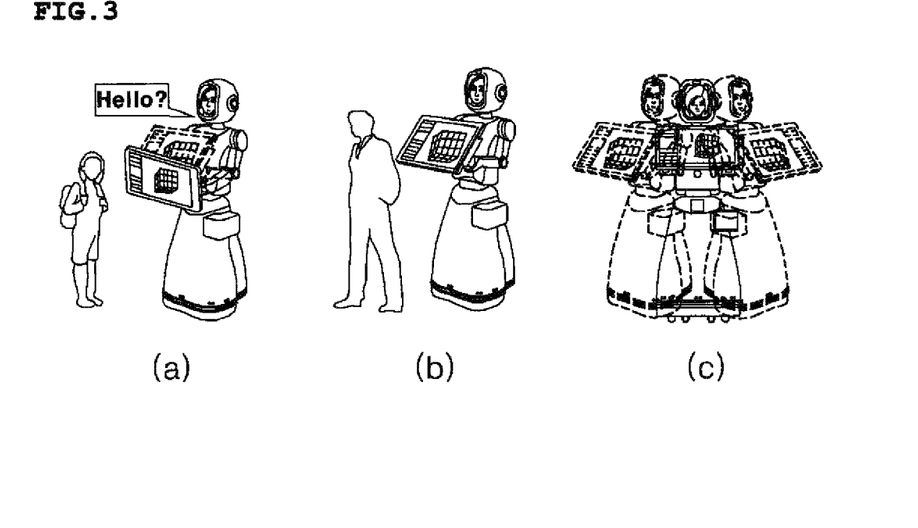
FIG. 3 is an exemplary view showing expressions of a robot.

Meanwhile, FIGS. 3(a), 3(b) and 3(c) show, for example, various kinds of operations that can be performed by a robot in different situations.

In addition, the recognition means includes a means for indirectly recognizing an external situation of a robot, as well as a means for directly recognizing a situation. For example, when a robot is placed at a specific external location, the recognition means includes an indirect recognition means for grasping the weather at the location of the robot through a GPS device and a wired or wireless network, as well as a direct recognition means such as a light amount sensor, a camera for photographing the sky or the like.

In addition, when the recognition means is a touch display means, an external situation of a robot can be determined by using touch input of the touch display.

In addition, the situation cognition frame may be determined by further using a state of the robot, as well as the external situation of the robot.

For example, when a robot is set to have an emotional state, a situation cognition frame can be determined by using the emotional state of the robot and an external situation of the robot together. A situation cognition frame of 'One child 1.5 meters tall or smaller approaches a robot in a very pleasant state' can be created if feeling of the robot is a very pleasant state, and a situation cognition frame of 'One child 1.5 meters tall or smaller approaches a robot in a gloomy state' can be created if feeling of the robot is a gloomy state.

In addition, a state of a robot may be a mechanical or electrical state of the robot, as well as an emotional state of the robot. The mechanical or electrical state of the robot may be regarded as a body state of a human being if the robot is compared to a human being. For example, when operating states of expression means of a robot are periodically checked and a specific expression means is inoperable, a situation cognition frame of 'One child 1.5 meters tall or smaller approaches a robot which cannot move the right arm' may be created.

A type and an input of the recognition means for determining a situation of the situation cognition frame may be set in advance.

Figure 6:
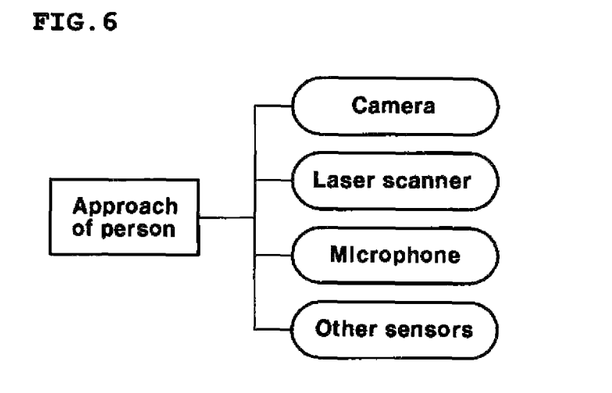
FIG. 6 is an exemplary view showing connection of a situation cognition frame and a recognition means.

Referring to FIG. 6, for example, a reflective signal input of a laser scanner, a facial image photographed using a camera, and voice recognition of a microphone may be previously set as a recognition means and an input thereof for determining a situation of a situation cognition frame of 'Approach of a person', or a reflective input of an ultrasonic sensor and a reflective signal input of a laser sensor may be previously set as a recognition means and an input thereof for determining a situation of a situation cognition frame of 'passing-by of a person'.

That is, although a user, i.e., a human being, may recognize similar situations, a type and an input of a recognition means appropriate for technically determining a corresponding situation may be different from those of the other means. According to the present invention, it is effective in that a user may correctly grasp a situation since a type and an input of a recognition means appropriate to a corresponding situation are determined only by simply inputting a situation cognition frame.

For example, if a situation cognition frame of 'One child 1.5 meters tall or smaller approaches a robot which cannot move the right arm' is input, a user may grasp the situation by previously setting a recognition means appropriate to the corresponding situation without paying attention to whether an ultrasonic sensor and a video camera or only a video camera will be used as a recognition means for grasping the corresponding situation.

In addition, although a type and an input of a recognition means appropriate for recognizing a specific situation may vary according to a version and a type of a robot, it is effective in that a user may create various kinds of robot control scenarios only by simply inputting a same situation cognition frame regardless of the type and the input of a recognition means.

A recognition means appropriate for determining a situation of a situation cognition frame may be previously set inside a robot or may be downloaded from a previously set server through a wired or wireless network.

Accordingly, when a recognition means appropriate for determining a situation of a situation cognition frame is set in the server and is downloaded, it is effective in that although the algorithm for determining a situation through the input of the recognition means is changed and a type and an input of the recognition means for determining a specific situation are changed, a user may create various kinds of robot control scenarios only by inputting a situation cognition frame in the same way as before without the need of considering the type and the input of the recognition means.

In addition, when a recognition means appropriate for determining a situation of a situation cognition frame is set in the server and is downloaded, it is effective in that although an already purchased robot is upgraded by additionally purchasing a specific recognition means, a user may create various kinds of robot control scenarios only by inputting a situation cognition frame in the same way as before without the need of considering the type and the input of the recognition means.

In addition, it is effective in that a user may easily and intuitively create a robot control scenario by inputting a situation cognition frame of a method similar to a human being, not by directly selecting a sensing input of a recognition means one by one by the user creating the robot control scenario.

A user may input an expression frame by selecting an expression frame configured of at least one or more outputs of at least one or more expression means, not by simply selecting one expression means and one output.

Figure 7:
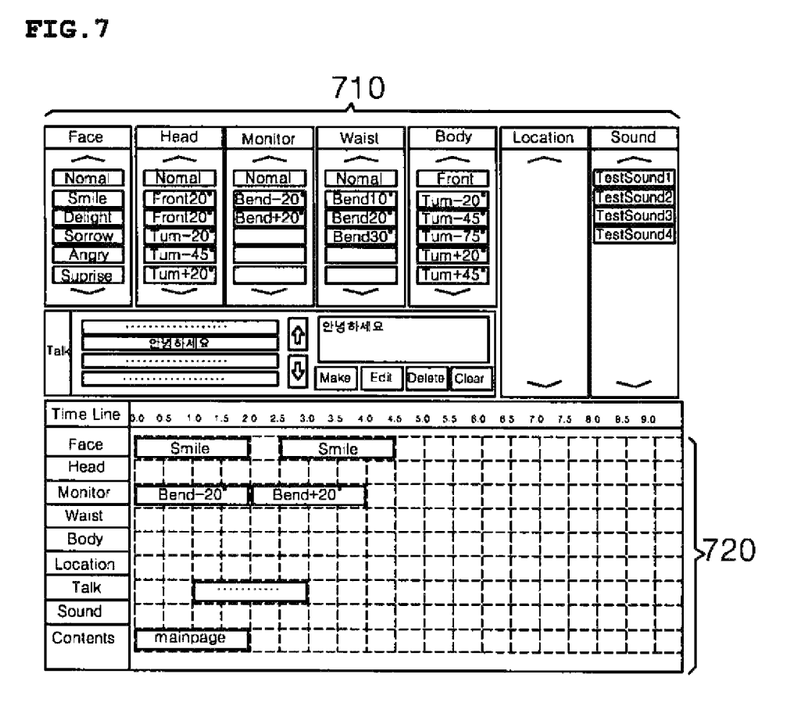
FIG. 7 is an exemplary view showing the configuration of an expression frame.

Selection of an expression frame may mean selecting constitutional elements 710 describing a corresponding situation and arranging the constitutional elements 710 on timelines 720.

As far as the expression means is a means for expressing a motion, contents or the like of a robot, such as a face or an arm of a robot, an LED, a display device or the like, a type thereof is not limited.

For example, a user may input an expression frame by selecting a previously set persuasive expression frame, and the persuasive expression frame may be configured of expressions of moving a robot in a specific direction while repeatedly turning the head of the robot left and right at a predetermined angle, repeatedly swinging the arms up and down at a predetermined angle, and outputting a voice of 'Hello, look at me for a moment'.

The expression frame may be configured by using at least one or more outputs of at least one or more expression means, and the expression means and the outputs may be configured by selecting an expression means and an output previously set by the user as shown in FIG. 7.

For example, as shown in FIG. 7, a user may select constitutional elements 710 such as a laughing expression of the face of a robot, playback of video contents, Text To Speech (TTS) of a specific sentence and the like and configure an expression frame by arranging the constitutional elements 710 on the timelines 720 in a drag-and-drop method or the like.

Accordingly, since an expression frame for a specific expression is configured by combining a plurality of outputs of a plurality of expression means, it is effective in that a user may use an expression frame appropriate to a previously set situation without the need of configuring the expression frame by combining an expression means and an output of the expression means one by one again whenever a scenario is created.

In addition, since an expression means for a specific expression and an output thereof are previously determined for an expression frame, a user may simply select the expression frame for a corresponding expression.

Figure 8:
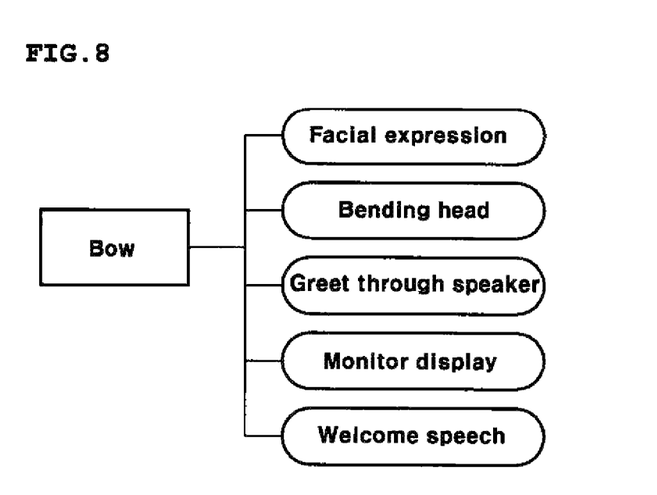
FIG. 8 is an exemplary view showing connection of an expression frame and an expression means.

For example, since bowing of a robot is a very frequently used expression, expression means and outputs as shown in FIG. 8 are set as basic expression frames of 'bow', and a user may input an expression frame only by selecting a frame expressing a bow.

The computational means creates a judgment frame by connecting a situation cognition frame and an expression frame received from a user.

The judgment frame refers to connection of a situation cognition frame and a judgment frame (→an expression frame). Accordingly, a plurality of judgment frames can be created by connecting a situation cognition frame to different expression frames or by connecting an expression frame to different situation cognition frames.

Accordingly, it is effective in that a user may create various robot control scenarios by creating various judgment frames by combining situation cognition programs (→frames) and expression frames according to a use location and a service characteristic of a robot.

If a judgment frame is created, the computational means creates a stage by selecting at least one or more judgment frames and transition frames (S420) and creates a scenario by connecting a transition frame of one stage to another stage in at least two or more stages (S430).

The transition frame is a situation cognition frame connected to another stage without being connected to an expression frame, which means a frame configured to execute another stage if a situation according to the situation cognition frame is recognized.

Figure 9:
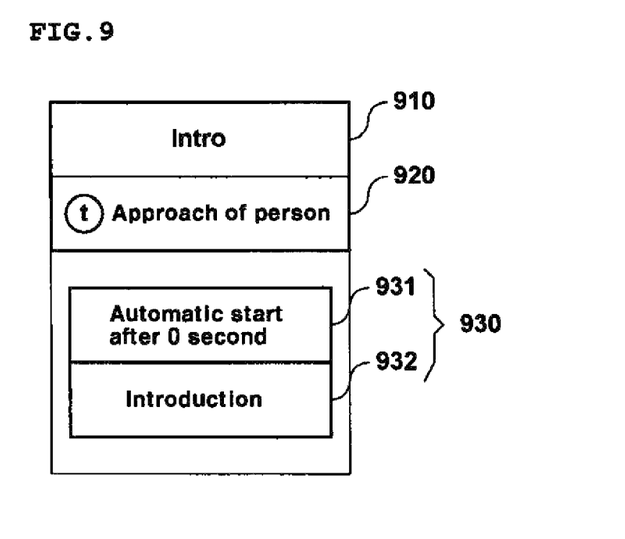
FIG. 9 is an exemplary view showing creation of a stage.

For example, referring to FIG. 9, a stage having a name 910 of 'Intro' is configured of a transition frame 920 having a name of 'Approach of a person' and a judgment frame 930. The judgment frame is configured by connecting a situation cognition frame 931 of 'Automatic start after 0 second' and an expression frame 932 of 'Introduction'.

The situation cognition frame 931 of 'Automatic start after 0 second' may be configured to recognize a situation in which flow of time passes 0 second from execution of stage 'Intro', and the expression frame 932 of 'Introduction' may be configured as an expression of playing back a specific moving image on a display device while repeatedly turning the head of a robot left and right at a predetermined angle.

The transition frame 920 of 'Approach of a person' may be a situation cognition frame of a configuration recognizing a situation of approach of a person toward a robot regardless of the type and number of persons.

Accordingly, if a robot executing the stage recognizes a situation of approach of a person toward the robot regardless of the type and number of persons while repeatedly turning the head of the robot left and right at a predetermined angle and playing back a specific moving image on the display device when flow of time passes 0 second from the execution of stage 'Intro', it may execute a stage connected to the transition frame 920 of 'Approach of a person'.

Since one or more of the transition frames may be selected and included in a stage, it may be possible to recognizing diverse situations while executing the stage and execute another stage appropriate to the recognized situation, and thus a robot control scenario for appropriately responding a robot to a variety of situations can be created.

Figure 10:
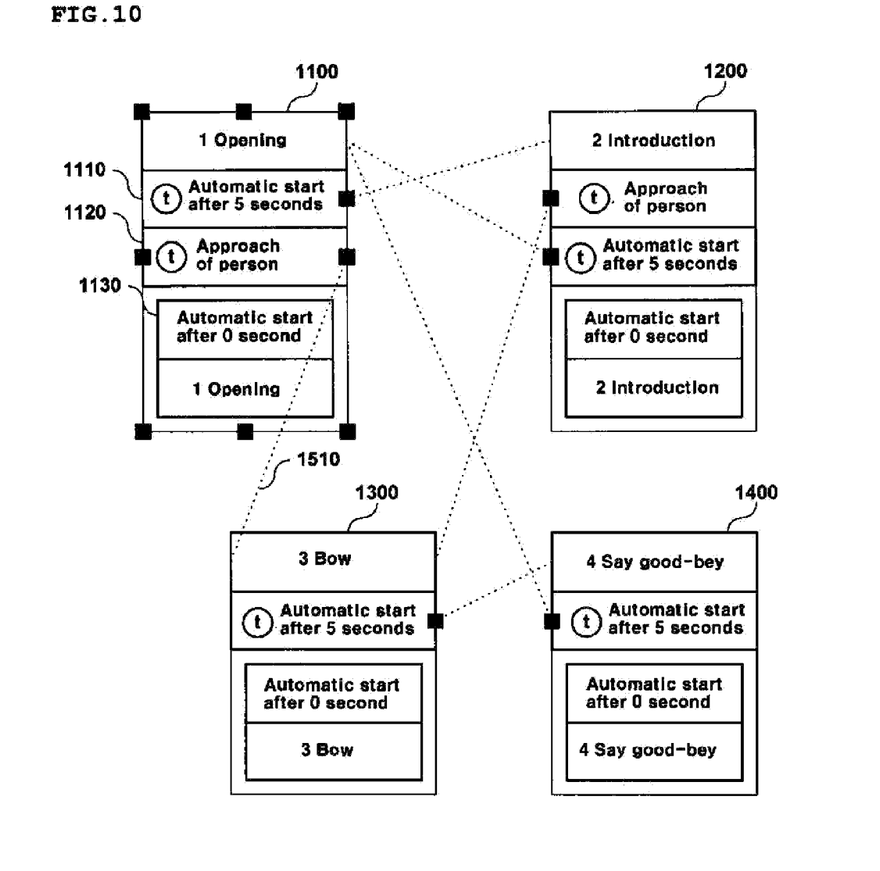
FIG. 10 is an exemplary view showing connection of stages.

FIG. 10 is a view showing an example of a scenario connecting a plurality of stages to each other through transition frames. If a robot executing the scenario according to FIG. 10 recognizes a situation corresponding to a situation cognition frame 1120 of 'Approach of a person' while executing a judgment frame 1130 configured of a situation cognition frame of 'Automatic start after 0 second' and an expression frame of 'Opening' at the stage 1100 having a name of 'Opening', the robot executes a stage 1300 having a name of 'Bow', and if the robot recognizes passage of five seconds from the execution of the stage having a name of 'Opening' without recognizing a situation corresponding to the situation cognition frame 1120 of 'Approach of a person', it executes a stage 1200 having a name of 'Intro'.

In the same manner, since a stage appropriate to each situation is executed through a transaction frame while executing another stage, it is not that operation of a robot is performed according to a series of previously determined sequences, but the robot actively and diversely operates according to a variety of situations, and thus it is effective in that a robot control scenario for operating the robot in a way further similar to a human being can be created.

In addition, it is effective in that a user may create an indefinitely working robot control scenario by connecting a plurality of stages to each other according to a specific situation without an effort of arranging motions or contents of a robot one by one on all the timelines corresponding to an amount of time for operating the robot.

Figure 11:
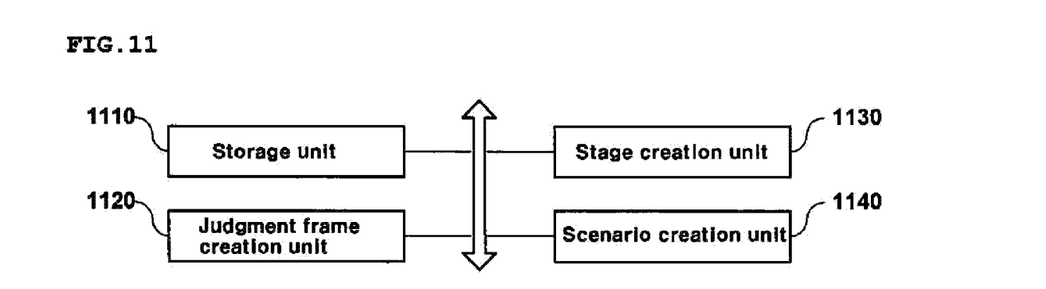
FIG. 11 is a block diagram showing a device for creating a robot control scenario according to the present invention.

An embodiment of a device for creating a robot control scenario according to the present invention will be described with reference to FIG. 11. A device for creating a robot control scenario according to the present invention includes a storage unit 1110 for storing data through an electric or magnetic signal, a judgment frame creation unit 1120, a stage creation unit 1130 and a scenario creation unit 1140.

The judgment frame creation unit 1120 selects a situation cognition frame and an expression frame, creates a judgment frame, and stores the judgment frame in the storage unit.

The stage creation unit 1130 selects at least one or more of the judgment frames and at least one or more transition frames, creates a stage, and stores the stage in the storage unit.

The scenario creation unit 1140 connects a transition frame of one stage to another stage and stores connection of the stages in the storage unit, in at least two or more stages.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method of creating a robot control scenario of a device for creating the robot control scenario, the method comprising:
   receiving a situation cognition frame and an expression frame and, by a computation means, creating a judgment frame, storing the judgment frame in a storage means, and displaying the judgment frame;
   selecting one or more judgment frames and one or more transition frames and, by the computation means, creating a stage, storing the stage in the storage means, and displaying the stage; and
   connecting a transition frame of one stage to another stage in at least two stages, storing the connection of the stages in the storage means, and displaying the connection of the stages by the computation means,
   wherein the situation cognition frame is determined by using an external situation of the robot using input of one or more recognition means,
   wherein the recognition means for determining the situation is previously set or modified by a user, and
   wherein the situation cognition frame is determined by further using a state of the robot.

2. The method according to claim 1, wherein the expression frame is configured by using one or more outputs of one or more expression means of the robot.

3. The method according to claim 2, wherein the expression means and the outputs are previously set or configured by selecting an expression means and an output which are modified by the user.

4. A device for creating a robot control scenario, the device comprising:
   a storage which stores data through an electric or magnetic signal;
   a judgment frame creator which selects a situation cognition frame and an expression frame, creates a judgment frame, and stores the judgment frame in the storage;
   a stage creator which selects one or more judgment frames and one or more transition frames, creates a stage, and stores the stage in the storage; and
   a scenario creator which connects a transition frame of one stage to another stage in at least two stages and stores the connection of the stages in the storage unit, wherein the situation cognition frame is determined by using an external situation of the robot using input of one or more recognition means,
wherein the recognition means for determining the situation is previously set or modified by a user, and
wherein the situation cognition frame is determined by further using a state of the robot.

5. The device according to claim 4, wherein the expression frame is configured by using one or more outputs of one or more expression means of the robot.

6. The device according to claim 5, wherein the expression means and the output are previously set or configured by selecting an expression means and an output which are modified by the user.

* * * * *